(12) United States Patent
Karr

(10) Patent No.: US 6,707,274 B1
(45) Date of Patent: Mar. 16, 2004

(54) OPTICAL BATTERY RECHARGER

(76) Inventor: Lawrence J. Karr, 445 15th St., Santa Monica, CA (US) 90402

( * ) Notice: Subject to any disclaimer, the term of this patent is extended or adjusted under 35 U.S.C. 154(b) by 0 days.

(21) Appl. No.: 10/428,056

(22) Filed: Apr. 29, 2003

Related U.S. Application Data

(60) Provisional application No. 60/377,449, filed on May 2, 2002.

(51) Int. Cl.[7] ............................................. H01M 10/46
(52) U.S. Cl. ................................................ 320/187
(58) Field of Search ............................ 320/101, 107, 320/108, 112, 113, 114, 115; 136/291, 293

(56) References Cited

U.S. PATENT DOCUMENTS

| 3,938,018 A | 2/1976 | Dahl |
| 4,661,758 A | 4/1987 | Whittaker |
| 4,808,904 A | 2/1989 | Ricaud et al. |
| 4,870,902 A | * 10/1989 | Simon et al. ................ 102/201 |
| 5,451,765 A | 9/1995 | Gerber |
| 6,275,325 B1 | 8/2001 | Sinclair |
| 6,310,960 B1 | * 10/2001 | Saaski et al. ................ 381/323 |
| 6,342,776 B1 | 1/2002 | Taylor et al. |

* cited by examiner

Primary Examiner—Edward Tso
(74) Attorney, Agent, or Firm—Thomas I. Rozsa; Tony D. Chen

(57) ABSTRACT

An optical battery recharger for recharging batteries of an electrical or electronic appliance. The recharger includes an internal unit built integrally within the appliance. The internal unit has one or more photovoltaic receptors connected to a battery charging circuit for converting optical power to electrical power to recharge the batteries. The recharger also has an external unit which has a solid-state light source connected to and powered by an electrical power source, a lens for focusing the light emitted from the light source, possibly through an aperture, onto the photovoltaic receptors, and a receptacle for aligning the photovoltaic receptor to the light source of said external unit when the recharger is used to recharge the batteries.

23 Claims, 1 Drawing Sheet

OPTICAL BATTERY RECHARGER

This application claims the benefit of Provisional application Ser. No. 60/377,449, filed May 2, 2002.

BACKGROUND OF THE INVENTION

1. Field of the Invention

The present invention generally relates to the field of battery chargers, and more particularly relates to the field of charging batteries within sealed portable electronic devices.

2. Description of the Prior Art

Rechargeable batteries are widely used in today's electronic products. Many portable electronic devices use rechargeable batteries to avoid constant battery replacement. For certain low-power devices it is possible to construct an internal mechanism that relies on shaking or cranking or other motion to drive a small electric generator that charges a battery or capacitor. However, in most common situations, these mechanisms are too large, expensive or power-limited to be practicable.

Conventional connection techniques exist which employ electrical contacts or inductive or acoustic coupling. Solar photovoltaic cells have also been used to utilize solar power.

The following six (6) prior art references are found to be pertinent to the of art of the present invention:
1. U.S. Pat. No. 3,938,018 issued to Dahl on Feb. 10, 1976 for "Induction Charging System" (hereafter the "Dahl Patent");
2. U.S. Pat. No. 4,661,758 issued to Whittaker on Apr. 28, 1987 for "Solar Power Supply And Battery Charging Circuit" (hereafter the "Whittaker Patent");
3. U.S. Pat. No. 4,808,904 issued to Ricaud et al. on Feb. 28, 1989 for "Portable Photovoltaic Battery Recharger" (hereafter the "Ricaud Patent");
4. U.S. Pat. No. 5,451,765 issued to Gerber on Sep. 19, 1995 for "Eye Safety Protection System For A Laser Transmission System Wherein Laser Energy Scattered Back Along The Beam Path Is Detected" (hereafter the "Gerber Patent");
5. U.S. Pat. No. 6,275,325 B1 issued to Sinclair on Aug. 14, 2001 for "Thermally Activated Microelectromechanical Systems Actuator" (hereafter the "Sinclair Patent"); and
6. U.S. Pat. No. 6,342,776 B1 issued to Taylor et al. on Jan. 29, 2002 for "Acoustic Charger For Electronic Devices" (hereafter the "Taylor Patent").

The Dahl Patent disclosed a normal 117-volt, 60-cycle source is converted into a high frequency signal resulting in radiation of a substantial portion of the energy in the signal. A receiving coil is inductively coupled to the radiation over a given distance substantially less than a wavelength of the high frequency signal to provide a received signal without the necessity of any electrical wires. The received signal in turn is converted into a D.C. signal and passed to a rechargeable battery for charging. The inductive coupling can be utilized for recharging portable electrical instruments having rechargeable batteries or for charging larger rechargeable batteries such as used in electrically driven vehicles.

The Whittaker Patent disclosed a photovoltaic power supply and battery charging system comprises a photovoltaic solar energy power supply panel connected through a blocking diode to a secondary storage battery which, in turn, is connected to a suitable load. A temperature sensitive reference voltage is supplied to one input of a voltage comparator, the other input to which is connected to the battery and thereby varies in accordance with the variations of charge on the battery. A short circuit shunt switch is connected directly across the photovoltaic panel; and this shunt switch is opened for varying periods of time by the output of a variable pulse width generator. The pulse width generator, in turn, is connected to and is controlled by the output of the voltage comparator to produce pulses of different widths. The charging current supplied to the battery then occurs in the form of high current pulses of varying widths depending upon the charge state of the battery.

The Ricaud Patent disclosed a portable photovoltaic battery recharger for simultaneously recharging a plurality of rechargeable batteries having different sizes and respective optimum charging current levels. The battery recharger includes a plurality of photovoltaic solar cells having a plurality of different selectively chosen surface areas for generating the respective optimum charging current levels when insulated, and battery receptacles for holding the plurality of rechargeable batteries in a recharging position. The plurality of solar cells are connected to the battery receptacles to transmit the charging current generated by each photovoltaic cell to respective ones of the plurality of battery receptacles such that batteries held in the battery receptacles are charged at respective optimum charging current levels.

The Gerber Patent disclosed an improved eye safety protection system for laser systems. The system measures energy returned along the optical axis itself. A beam splitter is installed in the optical axis and intercepts reflected energy back along the optical axis and passes the reflected energy to a photodetector which is used to measure the light scattered or reflected back along the emitting axis from the beam splitter. The output from the detector is passed to a comparator and regulation unit which adjusts the power level in the primary energy beam. Outgoing power can also be monitored.

The Sinclair Patent disclosed a microelectrical mechanical system (MEMS) actuator having coupled members that undergo different amounts of thermal expansion is disclosed for moving micromechanical objects, such as a mirror, toward and away from a surface or a planar substrate. The actuator members are a first elongate member at their respective distal ends. At their respective proximal ends, the members are mounted onto discrete electrical paths formed on the substrate. Thus, current applied to one electrical pathway is conducted along the first member to the second member, and to the other electrical path. The first member includes a metal conductor that provides a reduced resistivity for electrical current. Thus, when current is applied to the actuator, the second member generates more thermal energy due to its increased resistance and thereby thermally expands a greater amount than the first member, by thermally expanding the second member more than the first member, the distal ends of the first and second members are constrained to move away from the substrate. This movement is used to move a mirror out of the plane of the planar substrate. To accommodate the changing distance and angles between the actuator and the mirror, a sliding hinge is located between the actuator and the mirror.

The Taylor Patent disclosed a means for charging the battery of an electronic device by converting acoustic energy to electrical current. In one preferred embodiment, the protective layer of a liquid crystal display screen has a magnetic material disposed thereon. The housing of the liquid crystal display includes a corresponding coil of wire. As the protective layer has freedom of motion given by the liquid crystal panel, when acoustic energy is incident upon the protective layer, the protective layer moves, causing the magnetic material to generate a changing magnetic field in the coil. In an alternate embodiment, the protective layer is connected to piezoelectric transducers. When acoustic energy is incident upon the protective layer, the piezoelectric transducers are actuated. In another embodiment, the electronic device comprises an input for receiving concentrated acoustic energy from various sources including loudspeakers and acoustic waveguides.

While the above described prior art systems are related to battery charging devices, there are several limitations and drawbacks. For example, as the physical dimensions of the target devices shrink, or operation in harsh or wet environments is desired, physical contacts of the charging terminals become increasingly difficult to implement. Similarly, as the area available for a photovoltaic receptor diminishes, or the power requirements increase, solar charging becomes fatally limited by the solar constant.

In addition, inductive coupling limits the target appliance housing to nonconductive materials. Furthermore, acoustic coupling is generally impractical due to required sound levels.

Therefore, it is desirable to design and construct a new battery charging device that can recharge rechargeable batteries contained in a sealed housing in a target appliance or device.

SUMMARY OF THE INVENTION

The present invention is directed to a novel and unique optical battery charger for the recharging of batteries contained within a sealed housing in a target appliance. The target appliance can be any portable electronic device with modest power requirements.

The present invention optical battery recharger includes two main components. The portion internal to the target appliance includes one or more photovoltaic receptors and a charging circuit. The photovoltaic receptor(s) can be placed anywhere on the target appliance's surface or, in some circumstances, within the target appliance behind a portion of the housing that is transparent to the operational wavelength. In some applications, data can also be transmitted over the charging link. A passive laser interlock mechanism is also described using a micro-mechanical reflector.

The external portion of the present invention optical battery recharger consists of an electrical power source, a focused solid-state light source such as a light emitting diode (LED) or a light amplification by stimulated emission of radiation (LASER) diode, and a physical cradle that aligns the target appliance's receptor to the light source.

Further novel features and other objects of the present invention will become apparent from the following detailed description, discussion and the appended claims, taken in conjunction with the drawings.

BRIEF DESCRIPTION OF THE DRAWINGS

Referring particularly to the drawings for the purpose of illustration only and not limitation, there is illustrated.

DETAILED DESCRIPTION OF THE PREFERRED EMBODIMENTS

Although specific embodiments of the present invention will now be described with reference to the drawings, it should be understood that such embodiments are by way of example only and merely illustrative of but a small number of the many possible specific embodiments which can represent applications of the principles of the present invention. Various-changes and modifications obvious to one skilled in the art to which the present invention pertains are deemed to be within the spirit, scope and contemplation of the present invention as further defined in the appended claims.

Figure 1:
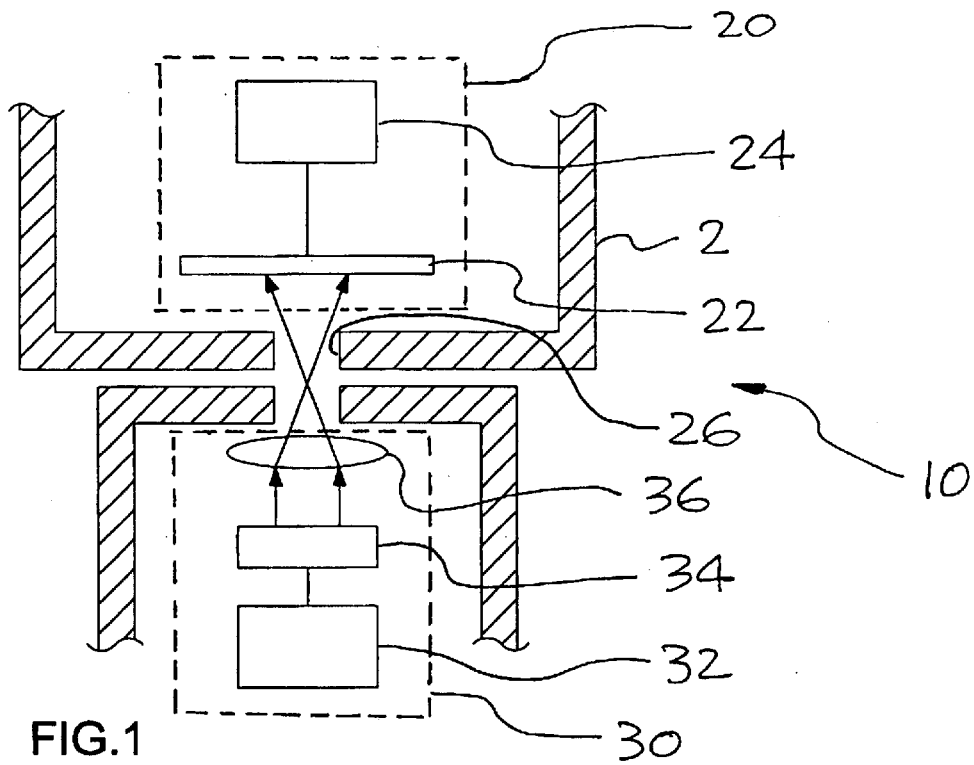
FIG. 1 is an schematic diagram illustrating one of the preferred embodiments of the present invention optical battery charger.
Figure 2:
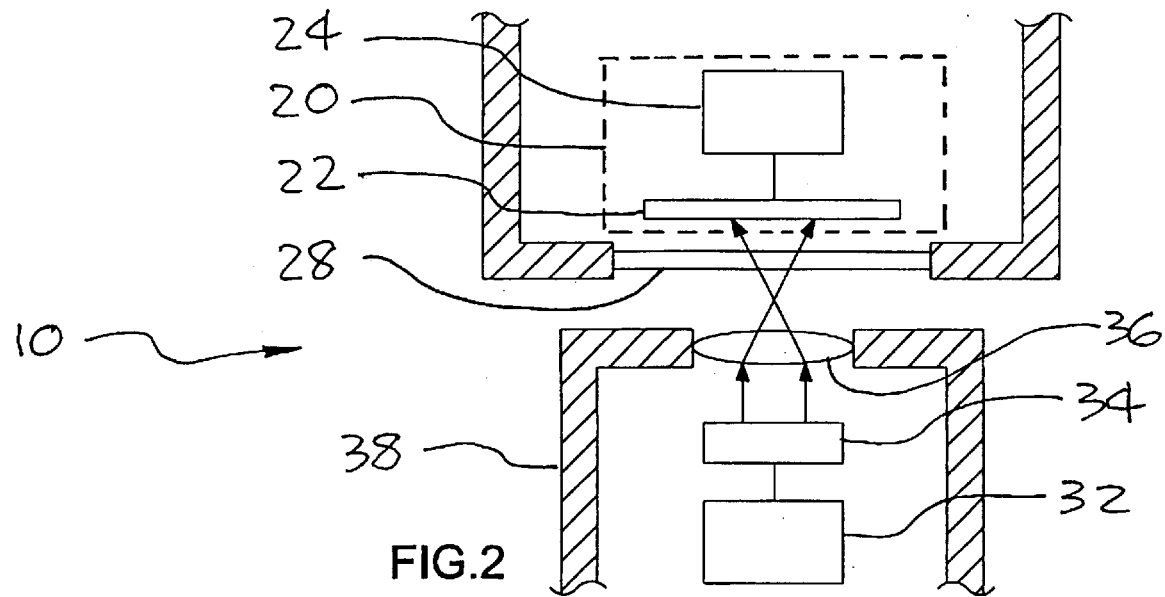
FIG. 2 is an schematic diagram illustrating another one of the preferred embodiments of the present invention optical battery charger.

Referring to FIGS. 1 and 2, there is shown at 10 an optical battery recharger of the present invention where the external power supply unit is coupled to the internal battery charging unit by means of optical power transfer.

The present invention optical battery recharger 10 includes two main units: an internal unit 20 and an external unit 30. The internal unit 20 is internal to and may be an integral part of a target appliance 2, and includes one or more photovoltaic receptors 22 and a charging circuit 24. The photovoltaic receptor(s) 22 can be placed anywhere adjacent to and behind a narrow slit 26 on the target appliance's surface or, in some circumstances, within the target appliance behind a portion 28 of the housing that is transparent to the operational wavelength.

The external unit 30 includes an electrical power source 32, a solid-state light source 34 such as a light emitting diode (LED) or a light amplification by stimulated emission of radiation (LASER) diode, a converging lens 36, and a physical cradle 38 that aligns the target appliance's receptor to the light source.

The present invention optical battery recharger 10 employs a laser light source, but may be generalized to any non-coherent light source with a narrow beam over a small span of wavelength, such as an LED. A laser light source, such as a laser diode, converts electrical power to optical power and transmits this optical power in a coherent beam. The beam is oriented by the fixed placement of the light source within a cradle or other receptacle, and the target is temporarily placed within this cradle for charging, in such a way that the receptor and light source are necessarily aligned. An interlock may provided to prevent laser output in the absence of a correctly aligned target.

The receptor can be on an appliance's surface or behind an opening in the appliance's surface. Such an opening may be sealed with a window or may be open. Ideally, such an opening is a small as possible, and the power beam is focused through it by means of a converging lens. Post-focus beam divergence spreads the beam over the receptor(s) and provides a first-order safety mechanism.

The safety interlock mechanism may be constructed using a variety of physical methods. As an example, for added security, a passive laser interlock mechanism is added using a micromechanical oscillating mirror to validate a physical interlock. Once the physical interlock was satisfied, the laser would briefly operate. A micro-mechanical mirror is superimposed over a small portion of the photoreceptor. Heat from the laser oscillates the mirror in a predictable fashion, periodically reflecting laser light back to the cradle assembly, where a photodetector would validate the oscillation frequency. A detection failure would terminate laser output until the target appliance was physically removed and reseated. This method of validation signaling will operate even though the target batteries are fully discharged.

An example application would be a wrist-worn underwater dive computer in which energy is consumed at a rate that suggests use of rechargeable batteries, and in which a water-tight metal case is desired. In this example, a charging circuit is part of the dive computer electronics, and photovoltaic receptors are placed within the case, adjacent to the rear panel. A pinhole window in the rear panel allows the photovoltaic receptors to be visible from the rear side of the dive computer case. A separate charging cradle contains the electric power source (or connection thereto), along with a laser diode. The cradle is constructed so that the only available modes of mating the dive computer to the cradle result in the alignment of the laser to the receptors' opening in the rear of the case.

Once a successful mating is accomplished, an interlock allows power to be transferred by continuous or pulsed application of the laser light through the window and onto the photo receptors, resulting in the charging of the computer's battery(s) via the charging circuit. If pulsed charging is used, this results in on-off keying of the voltage emanating from the computer's photoreceptor, which forms a binary signal. This signal can be used during the charging period to convey information to the dive computer. This would require the connection of the charging cradle to a data source, through a variety of existing methods.

In the above example, a laser diode typically used in compact disk (CD) write applications may be used. These devices have typical outputs of 100 mW at 780 nm. Since existing photovoltaic receptors are highly efficient in the infrared, any such receptor could be used within the device. Assuming a charging voltage of 3V, a battery capacity of 200 mAh, and a photovoltaic conversion efficiency of 40%, such a device might completely recharge the battery in 15 hours. In the more normal case of partial recharges, proportionately less time would be required.

Pulsing the laser to produce a concurrent data stream would lower the net power available during the period of data transfer, but since all conceivable information could be transferred in a few seconds, this would not appreciably effect the overall charging time.

Defined in detail, the present invention is a device for recharging one or more batteries of an electrical or electronic appliance, comprising: (a) an internal unit built integrally within said appliance and having at least one photovoltaic receptor connected to a battery charging circuit for converting optical power to electrical power to recharge said one or more batteries of said appliance; (b) an external unit positioned adjacent to said internal unit and having a solid-state light source connected to and powered by an electrical power source for emitting a light beam to said at least one photovoltaic receptor; (c) said internal unit having means for allowing said at least one photovoltaic receptor to receive said light beam emitted from said light source; (d) said external unit having means for focusing said light beam emitted from said light source and to be received by said at least one photovoltaic receptor; and (e) said external unit having a receptacle for housing said light source and having means for aligning said at least one photovoltaic receptor to said light source when said device is used to recharge said one or more batteries; (f) whereby said device can be positioned adjacent to said internal unit with said at least one photovoltaic receptor of said external unit aligned to said light source of said internal unit for recharging said one or more batteries of said appliance.

Defined broadly, the present invention is a device for recharging one or more batteries of an electrical or electronics appliance, comprising: (a) an internal unit built integrally within said appliance and having at least one photovoltaic receptor connected to a battery charging circuit for converting optical power to electrical power to recharge said one or more batteries of said appliance; and (b) an external unit positioned adjacent to said internal unit and having a solid-state light source connected to and powered by an electrical power source for emitting a light beam to said at least one photovoltaic receptor; (c) whereby said device can be positioned adjacent to said internal unit with said at least one photovoltaic receptor of said external unit aligned to said light source of said internal unit for recharging said one or more batteries of said appliance.

Of course the present invention is not intended to be restricted to any particular form or arrangement, or any specific embodiment, or any specific use, disclosed herein, since the same may be modified in various particulars or relations without departing from the spirit or scope of the claimed invention hereinabove shown and described of which the apparatus shown is intended only for illustration and disclosure of an operative embodiment and not to show all of the various forms or modifications in which this invention might be embodied or operated.

The present invention has been described in considerable detail in order to comply with the patent laws by providing full public disclosure of at least one of its forms. However, such detailed description is not intended in any way to limit the broad features or principles of the present invention, or the scope of the patent to be granted. Therefore, the invention is to be limited only by the scope of the appended claims.

What is claimed is:

1. A device for recharging one or more batteries of an electrical or electronic appliance, comprising:
   a. an internal unit built integrally within said appliance and having at least one photovoltaic receptor connected to a battery charging circuit for converting optical power to electrical power to recharge said one or more batteries of said appliance;
   b. an external unit positioned adjacent to said internal unit and having a solid-state light source connected to and powered by an electrical power source for emitting a light beam to said at least one photovoltaic receptor;
   c. said internal unit having means for allowing said at least one photovoltaic receptor to receive said light beam emitted from said light source;
   d. said external unit having means for focusing said light beam emitted from said light source and to be received by said at least one photovoltaic receptor; and
   e. said external unit having a receptacle for housing said light source and having means for aligning said at least one photovoltaic receptor to said light source when said device is used to recharge said one or more batteries;
   f. whereby said device can be positioned adjacent to said internal unit with said at least one photovoltaic receptor of said external unit aligned to said light source of said internal unit for recharging said one or more batteries of said appliance.

2. The device in accordance with claim 1, wherein said solid state light source is a laser diode.

3. The device in accordance with claim 1, wherein said solid state light source is an LED diode.

4. The device in accordance with claim 1, wherein said means for allowing said at least one photovoltaic receptor to receive said light beam emitted from said light source affixes said at least one photovoltaic receptor to outside of a surface of said appliance.

5. The device in accordance with claim 1, wherein said means for allowing said at least one photovoltaic receptor to receive said light beam emitted from said light source comprises a narrow opening on a surface of said appliance at a location adjacent to said at least one photovoltaic receptor.

6. The device in accordance with claim 1, wherein said means for allowing said at least one photovoltaic receptor to receive said light beam emitted from said light source comprises a transparent area on a surface of said appliance at a location adjacent to said at least one photovoltaic receptor.

7. The device in accordance with claim 1, wherein said focusing means is a converging lens which focuses said light beam from said light source and whose post-focus divergence spreads said light beam over said at least one photovoltaic receptor and provides optical safety.

8. The device in accordance with claim 1, further comprising an safety interlocking mechanism to prevent light emission from said light source when wherein said at least one photovoltaic receptor and said light source are not aligned.

9. The device in accordance with claim 8, wherein said safety interlocking mechanism comprises a micromechanical reflector.

10. The device in accordance with claim 1, wherein said light beam emitted from said light emitted from said light source and received by said at least one photovoltaic receptor can also carry information data from said external unit to said internal unit.

11. A device for recharging one or more batteries of an electrical or electronics appliance, comprising:
 a. an internal unit built integrally within said appliance and having at least one photovoltaic receptor connected to a battery charging circuit for converting optical power to electrical power to recharge said one or more batteries of said appliance; and
 b. an external unit positioned adjacent to said internal unit and having a solid-state light source connected to and powered by an electrical power source for emitting a light beam to said at least one photovoltaic receptor;
 c. whereby said device can be positioned adjacent to said internal unit with said at least one photovoltaic receptor of said external unit aligned to said light source of said internal unit for recharging said one or more batteries of said appliance.

12. The device in accordance with claim 11, wherein said solid state light source is a laser diode.

13. The device in accordance with claim 11, wherein said solid state light source is an LED diode.

14. The device in accordance with claim 11, wherein said internal unit further comprises means for allowing said at least one photovoltaic receptor to receive said light beam emitted from said light source.

15. The device in accordance with claim 14, wherein said means affixes said at least one photovoltaic receptor to outside of a surface of said appliance.

16. The device in accordance with claim 14, wherein said means comprises a narrow opening on a surface of said appliance at a location adjacent to said at least one photovoltaic receptor.

17. The device in accordance with claim 14, wherein said means comprises a transparent area on a surface of said appliance at a location adjacent to said at least one photovoltaic receptor.

18. The device in accordance with claim 11, wherein said external unit further comprises means for focusing said light beam emitted from said light source and to be received by said at least one photovoltaic receptor.

19. The device in accordance with claim 18, wherein said focusing means is a converging lens which focuses said light beam from said light source and whose post-focus divergence spreads said light beam over said at least one photovoltaic receptor and provides optical safety.

20. The device in accordance with claim 11, wherein said external unit further comprises a receptacle for housing said light source and having means for aligning said at least one photovoltaic receptor to said light source when said device is used to recharge said one or more batteries.

21. The device in accordance with claim 11, further comprising an safety interlocking mechanism to prevent light emission from said light source when wherein said at least one photovoltaic receptor and said light source are not aligned.

22. The device in accordance with claim 21, wherein said safety interlocking mechanism comprises a micromechanical reflector.

23. The device in accordance with claim 11, wherein said light beam emitted from said light emitted from said light source and received by said at least one photovoltaic receptor can also carry information data from said external unit to said internal unit.

* * * * *